(12) United States Patent
Endo et al.

(10) Patent No.: US 7,851,954 B2
(45) Date of Patent: Dec. 14, 2010

(54) VEHICLE DRIVE DEVICE

(75) Inventors: Yasuhiro Endo, Okazaki (JP); Ryoji Mizutani, Nishikamo-gun (JP); Kazutaka Tatematsu, Nagoya (JP); Tadafumi Yoshida, Nisshin (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 140 days.

(21) Appl. No.: 12/442,333

(22) PCT Filed: Oct. 1, 2007

(86) PCT No.: PCT/JP2007/069539

§ 371 (c)(1),
(2), (4) Date: Mar. 19, 2009

(87) PCT Pub. No.: WO2008/041761

PCT Pub. Date: Apr. 10, 2008

(65) Prior Publication Data

US 2010/0072865 A1    Mar. 25, 2010

(30) Foreign Application Priority Data

Oct. 4, 2006  (JP) .............................. 2006-272770
Feb. 15, 2007 (JP) .............................. 2007-035072

(51) Int. Cl.
  *H02K 11/04*  (2006.01)
  *H02P 1/00*  (2006.01)
(52) U.S. Cl. ..................... 310/68 D; 903/906; 903/909; 318/139; 318/245
(58) Field of Classification Search .............. 310/68 D, 310/89; 903/905, 906, 909, 952; 180/65.1, 180/65.5, 65.235; 318/139, 245, 254
See application file for complete search history.

(56) References Cited

U.S. PATENT DOCUMENTS 6,476,571 B1 * 11/2002 Sasaki .................... 318/139
2003/0143090 A1   7/2003 Iritani et al.

(Continued)

FOREIGN PATENT DOCUMENTS

JP        2001-119961 A     4/2001

(Continued)

OTHER PUBLICATIONS

Hideki Hisada, et al., "AISIN AM New Full Hybrid Transmission for FWD Vehicles", SAE Technical Paper Series, 2005, SAE International, Detroit, Michigan.

*Primary Examiner*—Quyen Leung
*Assistant Examiner*—Leda Pham
(74) *Attorney, Agent, or Firm*—Sughrue Mion, PLLC

(57) ABSTRACT

A vehicle drive device includes a motor generator (MG2), a power control unit controlling the motor generator (MG2), and a case housing the motor generator (MG2) and the power control unit. The power control unit includes a first inverter driving the motor generator (MG2) and a voltage converter boosting a power supply voltage to apply the voltage to the first inverter. A reactor L1 which is a component of the voltage converter is disposed such that at least a portion of a core comes into contact with the case for heat exchange. Consequently, the heat is dissipated to the case having a large heat capacity for integral housing, to thereby allow the heat dissipation performance of the reactor (L1) arranged in the limited space to be ensured.

10 Claims, 12 Drawing Sheets

U.S. PATENT DOCUMENTS

| | | |
|---|---|---|
| 2004/0013543 A1 | 1/2004 | Kimura et al. |
| 2004/0226761 A1 | 11/2004 | Takenaka et al. |
| 2009/0058326 A1* | 3/2009 | Oyobe et al. .................. 318/53 |

FOREIGN PATENT DOCUMENTS

| | | |
|---|---|---|
| JP | 2003-222078 A | 8/2003 |
| JP | 2004-044534 A | 2/2004 |
| JP | 2004-257821 A | 9/2004 |
| JP | 2004-284447 A | 10/2004 |
| JP | 2004-343845 A | 12/2004 |
| JP | 2005-073392 A | 3/2005 |
| JP | 2005-150517 A | 6/2005 |
| JP | 2006-210605 A | 8/2006 |
| JP | 2006-264473 A | 10/2006 |

\* cited by examiner

VEHICLE DRIVE DEVICE

TECHNICAL FIELD

The present invention relates to a vehicle drive device, and more particularly to a vehicle drive device in which a motor and a power control unit drive-controlling the motor are housed in one case.

BACKGROUND ART

Japanese Patent Laying-Open Nos. 2004-343845 and 2001-119961 disclose techniques for reducing the drive device in size by housing a motor and an inverter in one case for integration in the drive device for a hybrid vehicle, as a kind of a vehicle drive device, provided with a motor as a vehicle driving power source.

However, the drive device for a hybrid vehicle disclosed in each of Japanese Patent Laying-Open Nos. 2004-343845 and 2001-119961 has a structure merely having an inverter mounted on a motor, which leaves room for improvement in the position of the center of gravity of the vehicle with respect to the height direction when the device is mounted on the vehicle. Furthermore, the saving of space for mounting the drive device for a hybrid vehicle is not sufficiently taken into consideration.

In order to allow the device to be mounted in various types of vehicles, it is desirable that the inverter and the motor can be arranged within the contour approximately equal to that of the automatic transmission disposed adjacent to the engine in the ordinary vehicle.

Furthermore, a vehicle equipped with a converter boosting the battery voltage for improving efficiency is recently developed. Japanese Patent Laying-Open Nos. 2004-343845 and 2001-119961 described above do not disclose the concept that the inverter and the motor are integrated in consideration of integration of the boost converter. The integration of the boost converter also requires consideration of the heat generated in the boost converter portion. Particularly, the reactor that is large in size as a component is required to be cooled in some way.

Furthermore, in the power semiconductor elements including a boost converter and an inverter, the heat amount differs in accordance with the difference in the power loss occurring at the time of the switching operation. Therefore, when the boost converter is integrated, it is necessary to ensure the coolness of the power semiconductor element along with the reactor as described above.

An object of the present invention is, in a vehicle drive device in which a rotating electrical machine and an electric circuit group (a converter, an inverter and the like) driving the rotating electrical machine are integrated, to ensure the coolness of the electric circuit group and also to reduce the device in size.

DISCLOSURE OF THE INVENTION

A vehicle drive device according to the present invention includes a rotating electrical machine, a power control unit controlling the rotating electrical machine, and a case housing the rotating electrical machine and the power control unit. The power control unit includes an inverter driving the rotating electrical machine, and a voltage converter configured to have a reactor, for boosting a power supply voltage to apply the boosted voltage to the inverter. The reactor includes a core disposed to transmit and receive heat to and from the case and a coil wound around the core.

According to the above-described vehicle drive device, it is possible to implement the drive device having an integrated structure in which the rotating electrical machine, and the inverter and the voltage converter for driving the rotating electrical machine are integrally housed, and also possible to dissipate the heat between the core of the reactor and the case. Accordingly, the heat is dissipated to the case of the drive device having a large heat capacity for integral housing, to thereby allow the coolness of the reactor to be ensured. Since this allows the degree of flexibility in the arrangement of the reactor to be increased, the device can be reduced in size.

Preferably, the core is disposed such that at least a portion of the core is in contact with the case for transmission and reception of the heat.

According to the above-described vehicle drive device, the contact between the core and the case causes the heat to be directly dissipated between the reactor and the case. Accordingly, the heat is dissipated to the case having a large heat capacity, which allows the heat dissipation performance of the reactor efficiently arranged in the limited space to be ensured.

Preferably, the vehicle drive device further includes an insulation member having heat conductivity and disposed in at least a portion of a gap between the reactor and the case.

According to the above-described vehicle drive device, the heat generated in the reactor can be efficiently dissipated to the case by using the insulation member as a heat transfer agent. Accordingly, the heat is dissipated to the case having a large heat capacity, which allows the heat dissipation performance of the reactor efficiently arranged in the limited space to be improved.

Preferably, the insulation member includes an insulation resin having heat conductivity. The insulation resin is filled in the gap between the reactor and the case.

According to the above-described vehicle drive device, since the heat generated in the reactor is dissipated to the case using, as a heat transfer agent, a resin molding the reactor, the heat dissipation performance of the reactor can be further improved.

Preferably, an internal combustion engine is further mounted on the vehicle. The drive device further includes a damper to which a crankshaft of the internal combustion engine is coupled, and a power transmission mechanism combining power generated by the internal combustion engine with power generated by the rotating electrical machine for transmission to a drive shaft. The case is integrally configured to house the damper, the rotating electrical machine and the power transmission mechanism.

According to the above-described vehicle drive device, the present invention is applied to a hybrid vehicle drive device further integrally housing the damper and the power transmission mechanism, to thereby allow the reactor to be efficiently arranged and the coolness to be ensured, with the result that the drive device can be further reduced in size.

Preferably, the power control unit further includes a circuit element substrate on which a power element of each of the inverter and the voltage converter is mounted. The reactor and the circuit element substrate are disposed in the case such that, when projected in a direction of a rotation shaft, the reactor and the circuit element substrate fall within a vertical dimension of a projected portion of the case, when mounted on the vehicle, that houses the damper, the rotating electrical machine and the power transmission mechanism.

According to the above-described vehicle drive device, since the center of gravity can be lowered when the drive device is mounted on the vehicle, the running stability of the vehicle can be improved.

Preferably, the power control unit further includes a circuit element substrate on which a power element of each of the inverter and the voltage converter is mounted. The reactor and the circuit element substrate are disposed in the case such that, when projected in a direction of a rotation shaft, the reactor and the circuit element substrate fall within a horizontal dimension of a projected portion of the case, when mounted on the vehicle, that houses the damper, the rotating electrical machine and the power transmission mechanism.

According to the above-described vehicle drive device, the drive device can be further reduced in size.

Preferably, the power control unit further includes a circuit element substrate having a main planar surface on which a power element of each of the inverter and the voltage converter is mounted. On the opposite side of the main planar surface of the circuit element substrate, a flow path through which a cooling medium cooling the power element substrate flows is provided. The power element having a relatively larger heat amount of the inverter and the voltage converter is disposed in the flow path upstream from the power element having a relatively smaller heat amount of the inverter and the voltage converter.

According to the above-described vehicle drive device, the power element can be efficiently cooled without the need to improve the performance of the cooling system. Consequently, the cooling system can be prevented from being increased in size and the device can be reduced in size.

Preferably, the rotating electrical machine includes first and second rotating electrical machines. The inverter includes first and second inverters provided corresponding to the first and second rotating electrical machines, respectively. The power control unit further includes a circuit element substrate having a main planar surface on which a power element of each of the first and second inverters and the voltage converter is mounted. On the opposite side of the main planar surface of the circuit element substrate, a flow path through which a cooling medium cooling the power element substrate flows is provided. The power element having a relatively larger heat amount of the first and second inverters and the voltage converter is disposed in the flow path upstream from the power element having a relatively smaller heat amount of the first and second inverters and the voltage converter.

According to the above-described vehicle drive device, the power element can be efficiently cooled without the need to improve the performance of the cooling system. Consequently, the cooling system can be prevented from being increased in size, and the device can be reduced in size.

Preferably, the first rotating electrical machine is a motor coupled to a driving wheel of the vehicle, and the second rotating electrical machine is a power generator coupled to the internal combustion engine. The power element of the first inverter is disposed in the flow path upstream from the power element of the second inverter.

According to the above-described vehicle drive device, the first inverter having a larger heat amount is disposed in the flow path of the cooling medium upstream of the second inverter having a smaller heat amount, with the result that the power element can be efficiently cooled without the need to improve the performance of the cooling system.

Preferably, the power element of the voltage converter is disposed in the flow path upstream from the power element of each of the first and second inverters.

According to the above-described vehicle drive device, the voltage converter having the largest heat amount is disposed in the flow path of the cooling medium upstream of the first and second inverters, with the result that the power element can be efficiently cooled without the need to improve the performance of the cooling system.

Preferably, the voltage converter further includes a capacitor smoothing an output voltage. The circuit element substrate has at least a portion disposed in a region between the reactor and the capacitor. The power control unit further includes a conductor member electrically connecting the power element of the voltage converter and the reactor. The flow path is provided with an inlet and an outlet of the cooling medium. The power element of the voltage converter is disposed closer to the reactor and the inlet of the cooling medium than the power element of each of the first and second inverters is.

According to the above-described vehicle drive device, the wiring length of the conductor member for electrically connecting the power element of the voltage converter and the reactor can be shortened. Consequently, since the wiring inductance of the conductor member can be decreased, the surge voltage can be decreased that occurs at the time of the switching operation of the voltage converter.

According to the present invention, in the structure in which the rotating electrical machine and the electric circuit group (a converter, an inverter and the like) for driving the rotating electrical machine are integrally housed, the coolness of the electric circuit group can be ensured and the device can be reduced in size.

BEST MODES FOR CARRYING OUT THE INVENTION

Figure 1:
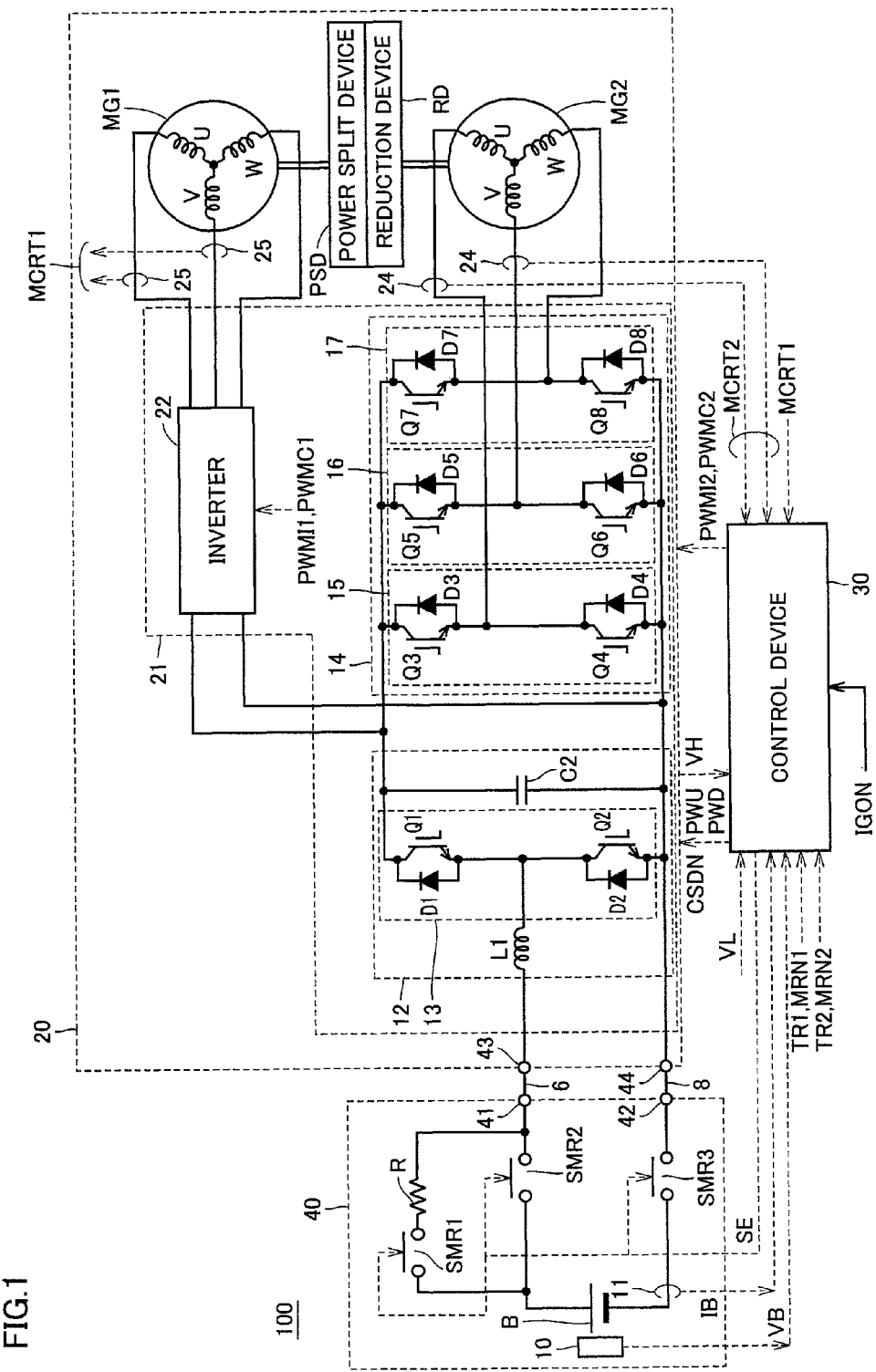
FIG. 1 is a circuit diagram showing a configuration concerning the motor generator control of a hybrid vehicle according to an embodiment of the present invention.

The embodiments of the present invention will be hereinafter described in detail with reference to the accompanying drawings, in which the same or corresponding components are designated by the same reference characters.

As apparent in the following description, the present invention is directed to the structure of a power control unit mounted in the vehicle drive device and a cooling system configuration thereof. In the present embodiment, as a typical example of a vehicle drive device including a power control unit, a preferable configuration of the drive device for a hybrid vehicle will be first described which is provided with a motor corresponding to an "rotating electrical machine" and an internal combustion engine (engine) as a vehicle driving power source. The hybrid vehicle drive device described below has a configuration suitable for downsizing in which a motor (hereafter also referred to as a motor generator) and an electric circuit system including an inverter driving the motor generator and a converter having a reactor as a component are housed in the same case for integration.

However, for the purpose of confirmation, it is to be noted that the application of the present invention is not limited to the hybrid vehicle equipped with a drive device as described below, and, if the vehicle drive device including a power control unit is employed, the present invention can be applied to a hybrid vehicle, an electric vehicle and the like having an arbitrary configuration.

[Description of Component in Vehicle]

FIG. 1 is a circuit diagram showing a configuration concerning the motor generator control of a hybrid vehicle 100 according to the embodiment of the present invention.

Referring to FIG. 1, vehicle 100 includes a drive device 20, a control device 30, a battery unit 40, and an engine and wheels which are not shown.

Drive device 20 includes motor generators MG1 and MG2, a power split device PSD, a reduction device RD, and a power control unit 21 controlling motor generators MG1 and MG2.

Power split device PSD basically serves as a mechanism which is coupled to an engine 4 and motor generators MG1, MG2 to distribute the power among them. For example, as a power split device, a planetary gear train having three rotation shafts of a sun gear, a planetary carrier and a ring gear can be used.

Two of the rotation shafts of power split device PSD are connected to the rotation shafts of engine 4 and motor generator MG1, respectively, and the remaining one rotation shaft is connected to reduction device RD. The rotation of motor generator MG2 is decelerated by reduction device RD integrated with power split device PSD and transmitted to power split device PSD.

The rotation shaft of reduction device RD is coupled to the wheel by a reduction gear and a differential gear which are not shown. It is to be noted that reduction device RD may be dispensable, and it may be configured such that the rotation of motor generator MG2 is transmitted to power split device PSD without deceleration.

Terminals 41 and 42 are provided in battery unit 40. Furthermore, terminals 43 and 44 are provided in drive device 20. Vehicle 100 further includes a power cable 6 connecting terminal 41 and terminal 43, and a power cable 8 connecting terminal 42 and terminal 44.

Battery unit 40 includes a battery B; a system main relay SMR3 connected between the negative pole of battery B and terminal 42; a system main relay SMR2 connected between the positive pole of battery B and terminal 41; and a system main relay SMR1 and a limiting resistor R connected in series between the positive pole of battery B and terminal 41. The conducting/non-conducting state in each of system main relays SMR1-SMR3 is controlled in accordance with a control signal SE received from control device 30.

Battery unit 40 further includes a voltage sensor 10 measuring a voltage VB across the terminals of battery B and a current sensor 11 sensing a current IB flowing through battery B.

A nickel-hydrogen or lithium-ion secondary battery, a fuel cell, and the like can be used as battery B. In addition, a large-capacity capacitor such as an electric double layer capacitor may be used as a power storage device in place of battery B.

Power control unit 21 includes inverters 22 and 14 provided corresponding to motor generators MG1 and MG2, respectively, and a boost converter 12 provided in common in inverters 22 and 14.

Boost converter 12 boosts the voltage between terminals 43 and 44. Inverter 14 converts the direct-current (DC) voltage applied from boost converter 12 into a three-phase alternating-current (AC) voltage and outputs the voltage to motor generator MG2.

Boost converter 12 includes a reactor L1 having one end connected to terminal 43; IGBT elements Q1 and Q2 connected in series across the output terminals of boost converter 12 which outputs a boosted voltage VH; diodes D1 and D2 connected in parallel to IGBT elements Q1 and Q2, respectively; and a smoothing capacitor C2. Capacitor C2 smoothes the voltage boosted by boost converter 12.

Reactor L1 has the other end connected to the emitter of IGBT element Q1 and the collector of IGBT element Q2. Diode D1 has a cathode connected to the collector of IGBT element Q1 and has an anode connected to the emitter of IGBT element Q1. Diode D2 has a cathode connected to the collector of IGBT element Q2 and has an anode connected to the emitter of IGBT element Q2.

Inverter 14 converts the DC voltage output from boost converter 12 into a three-phase AC voltage and outputs the voltage to motor generator MG2 driving the wheels. Furthermore, in accordance with the regenerative braking, inverter 14 returns the power generated in motor generator MG2 to boost converter 12. In this case, boost converter 12 is controlled by control device 30 so as to operate as a step-down circuit.

Inverter 14 includes a U-phase arm 15, a V-phase arm 16, and a W-phase arm 17. U-, V- and W-phase arms 15, 16 and 17 are connected in parallel between the output lines of boost converter 12.

U-phase arm 15 includes IGBT elements Q3 and Q4 connected in series and diodes D3 and D4 connected in parallel to IGBT elements Q3 and Q4, respectively. Diode D3 has a cathode connected to the collector of IGBT element Q3 and has an anode connected to the emitter of IGBT element Q3. Diode D4 has a cathode connected to the collector of IGBT element Q4 and has an anode connected to the emitter of IGBT element Q4.

V-phase arm 16 includes IGBT elements Q5 and Q6 connected in series and diodes D5 and D6 connected in parallel to IGBT elements Q5 and Q6, respectively. Diode D5 has a cathode connected to the collector of IGBT element Q5 and has an anode connected to the emitter of IGBT element Q5. Diode D6 has a cathode connected to the collector of IGBT element Q6 and has an anode connected to the emitter of IGBT element Q6.

W-phase arm 17 includes IGBT elements Q7 and Q8 connected in series and diodes D7 and D8 connected in parallel to IGBT elements Q7 and Q8, respectively. Diode D7 has a cathode connected to the collector of IGBT element Q7 and has an anode connected to the emitter of IGBT element Q7.

Diode D8 has a cathode connected to the collector of IGBT element Q8 and has an anode connected to the emitter of IGBT element Q8.

The intermediate point of each phase arm is connected to each phase end of each phase coil of motor generator MG2. In other words, motor generator MG2 is a three-phase permanent magnet synchronous motor, in which each of three coils of the U-, V- and W-phases has one end connected in common to a neutral point. The U-phase coil has the other end connected to a connection node of IGBT elements Q3 and Q4. The V-phase coil has the other end connected to a connection node of IGBT elements Q5 and Q6. The W-phase coil has the other end connected to a connection node of IGBT elements Q7 and Q8.

A current sensor 24 detects the current flowing through motor generator MG2 as a motor current value MCRT2 and outputs motor current value MCRT2 to control device 30.

Inverter 22 is connected to boost converter 12 in parallel with inverter 14. Inverter 22 converts the DC voltage output from boost converter 12 to a three-phase AC voltage and outputs the voltage to motor generator MG1. Inverter 22 receives the boosted voltage from boost converter 12 to drive motor generator MG1, for example, to start the engine.

Furthermore, inverter 22 returns the electric power to boost converter 12 which is generated in motor generator MG1 by the rotation torque transmitted from the crankshaft of the engine. In this case, boost converter 12 is controlled by control device 30 so as to operate as a step-down circuit.

Although not shown, the configuration within inverter 22 is the same as that of inverter 14, and detailed description thereof will not be repeated.

Control device 30 receives torque command values TR1, TR2, motor rotation speed MRN1, MRN2, each value of voltages VB, VL, VH, and current IB, motor current values MCRT1, MCRT2, and a start-up signal IGON.

Torque command value TR1, motor rotation speed MRN1 and motor current value MCRT1 are related to motor generator MG1, and torque command value TR2, motor rotation speed MRN2 and motor current value MCRT2 are related to motor generator MG2.

Furthermore, voltage VB is a voltage of battery B, and current IB is a current flowing through battery B. Voltage VL is a voltage that has yet to be boosted by boost converter 12, and voltage VH is a voltage that has been boosted by boost converter 12.

Control device 30 outputs to boost converter 12 a control signal PWU instructing to boost the voltage, a control signal PWD to lower the voltage, and a signal CSDN to inhibit an operation.

Furthermore, control device 30 outputs to inverter 14 a drive instruction PWMI2 for converting the DC voltage as an output of boost converter 12 to an AC voltage for driving motor generator MG2, and a regeneration instruction PWMC2 for converting the AC voltage generated by motor generator MG2 into a DC voltage and returning the voltage to the boost converter 12 side.

Similarly, control device 30 outputs to inverter 22 a drive instruction PWMI1 for converting the DC voltage into an AC voltage for driving motor generator MG1, and a regeneration instruction PWMC1 for converting the AC voltage generated by motor generator MG1 into a DC voltage and returning the voltage to the boost converter 12 side.

Figure 2:
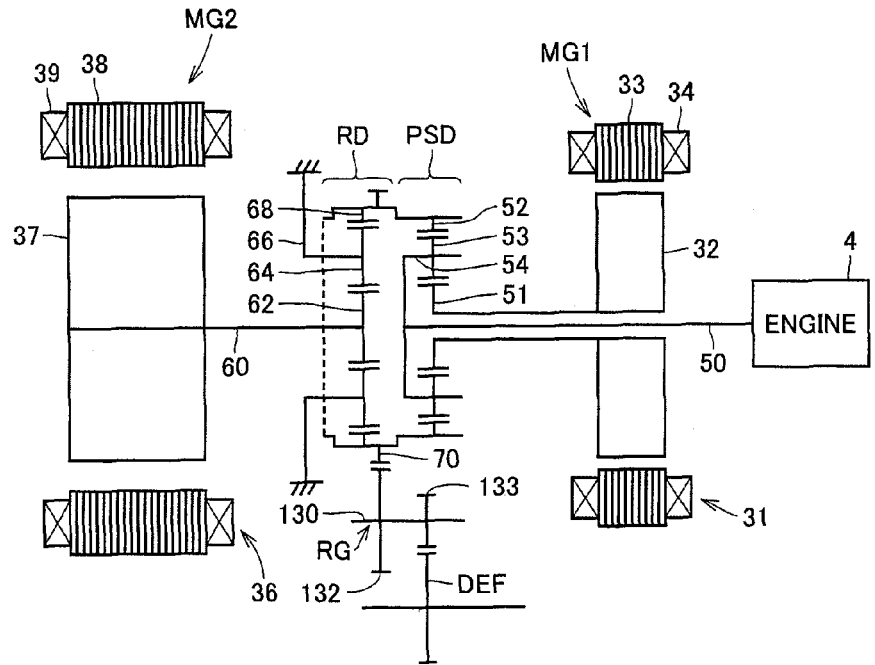
FIG. 2 is a schematic diagram for illustrating a power split device and a reduction device in FIG. 1 in detail.

FIG. 2 is a schematic diagram for illustrating power split device PSD and reduction device RD in FIG. 1 in detail.

Referring to FIG. 2, the vehicle drive device includes motor generator MG2, reduction device RD connected to the rotation shaft of motor generator MG2, an axle that rotates in accordance with the rotation of the rotation shaft decelerated by reduction device RD, engine 4, motor generator MG1, and power split device PSD for distributing power among reduction device RD, engine 4 and motor generator MG1. Reduction device RD provides the reduction ratio from motor generator MG2 to power split device PSD having, for example, at least twice or more.

A crank shaft 50 of engine 4, a rotor 32 of motor generator MG1 and a rotor 37 of motor generator MG2 rotate about the same axis.

Power split device PSD is a planetary gear in the example shown in FIG. 2, and includes a sun gear 51 coupled to a hollow sun gear shaft having a shaft center through which crankshaft 50 passes; a ring gear 52 rotatably supported on the same axis as crankshaft 50; a pinion gear 53 arranged between sun gear 51 and ring gear 52 and revolving around the outer circumference of sun gear 51 while rotating on its own axis; and a planetary carrier 54 coupled to an end portion of crankshaft 50 and supporting the rotation shaft of each pinion gear 53.

In power split device PSD, three shafts including a sun gear shaft coupled to sun gear 51, a ring gear case coupled to ring gear 52, and a crank shaft 50 coupled to planetary carrier 54 serve as power input/output shafts. When each power input to/output from two of these three shafts is determined, the power to be input to/output from the remaining one shaft is determined based on the power input to/output from the other two shafts.

A counter drive gear 70 for deriving power is provided outside the ring gear case and rotates integrally with ring gear 52. Counter drive gear 70 is connected to a power transmission reduction gear RG. The power is transmitted between counter drive gear 70 and power transmission reduction gear RG. Power transmission reduction gear RG drives a differential gear DEF. Furthermore, on a downhill road and the like, the rotation of the wheels is transmitted to differential gear DEF and power transmission reduction gear RG is driven by differential gear DEF.

Motor generator MG1 includes a stator 31 forming a rotating magnetic field, and a rotor 32 disposed within stator 31 and having a plurality of permanent magnets embedded therein. Stator 31 includes a stator core 33 and a three-phase coil 34 wound around stator core 33. Rotor 32 is coupled to the sun gear shaft that rotates integrally with sun gear 51 of power split device PSD. Stator core 33 is formed by stacking thin electromagnetic steel plates and fixed in a case which is not shown.

Motor generator MG1 operates as an electric motor for rotating and driving rotor 32 by the interaction between a magnetic field by the permanent magnets embedded in rotor 32 and a magnetic field formed by three-phase coil 34. Furthermore, motor generator MG1 also operates as a power generator generating electromotive force at opposite ends of three-phase coil 34 by the interaction between the magnetic field by the permanent magnets and the rotation of rotor 32.

Motor generator MG2 includes a stator 36 forming a rotating magnetic field, and a rotor 37 disposed within stator 36 and having a plurality of permanent magnets embedded therein. Stator 36 includes a stator core 38 and a three-phase coil 39 wound around stator core 38.

Rotor 37 is coupled via reduction device RD to the ring gear case that rotates integrally with ring gear 52 of power split device PSD. Stator core 38 is, for example, formed by stacking thin electromagnetic steel plates and fixed in a case which is not shown.

Motor generator MG2 also operates as a power generator generating electromotive force at the opposite ends of three-phase coil 39 by the interaction between the magnetic field by the permanent magnets and the rotation of rotor 37. Furthermore, motor generator MG2 also operates as an electric motor for rotating and driving rotor 37 by the interaction between the magnetic field by the permanent magnets and the magnetic field formed by three-phase coil 39.

Reduction device RD provides deceleration by the structure in which a planetary carrier 66 as one of rotating elements of the planetary gear is fixed in the case of the vehicle drive device. In other words, reduction device RD includes a sun gear 62 coupled to the shaft of rotor 37, a ring gear 68 rotating integrally with ring gear 52, and a pinion gear 64 engaging with ring gear 68 and sun gear 62 for transmitting the rotation of sun gear 62 to ring gear 68.

For example, the reduction ratio can be increased to twice or more by setting the number of teeth of ring gear 68 to twice or more the number of teeth of sun gear 62.

[Description of Component Arrangement in Integrated Structure]

The arrangement of each component in the drive device will then be described, in which the inverter and the converter driving the motor generator are integrally housed.

Figure 3:
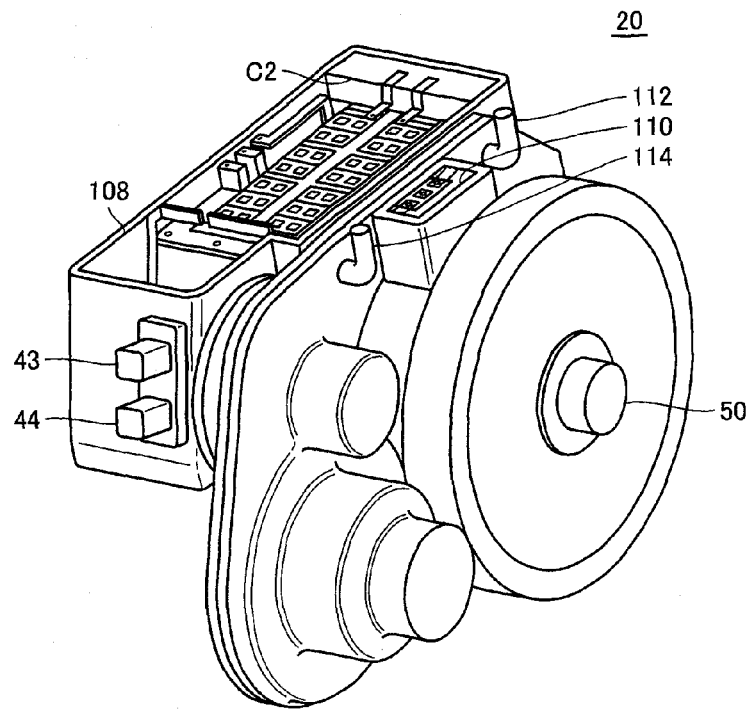
FIG. 3 is a perspective view of the appearance of a drive device for a hybrid vehicle according to the embodiment of the present invention.
Figure 4:
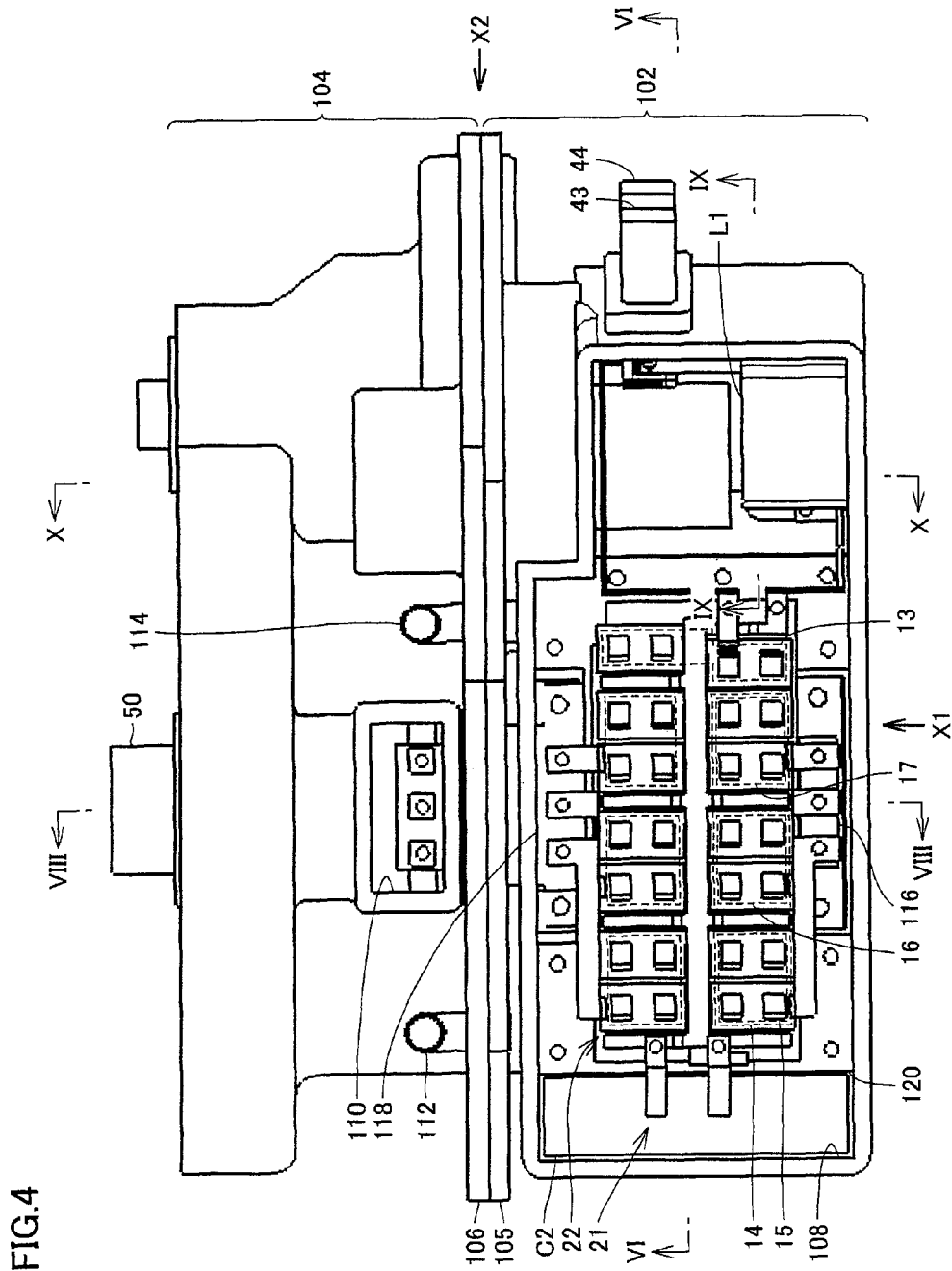
FIG. 4 is a plan view of the drive device.

FIG. 3 is a perspective view of the appearance of drive device 20 for a hybrid vehicle according to the embodiment of the present invention. FIG. 4 is a plan view of drive device 20.

Referring to FIGS. 3 and 4, the case of drive device 20 is configured such that it can be divided into a case 104 and a case 102. Case 104 is mainly for housing motor generator MG1, and case 102 is mainly for housing motor generator MG2 and power control unit 21. It is to be noted that the case can be made of metal material such as aluminum, resin material having resistance to high-temperature environment and resistance to lubricating oil, and the like.

A flange 106 is formed in case 104, a flange 105 is formed in case 102, and these flanges 106 and 105 are fixed by means of a bolt or the like, to thereby cause cases 104 and 102 to be integrated with each other.

Case 102 is provided with an opening 108 for installing power control unit 21. In opening 108, capacitor C2 is housed on the inner left side (in the direction of vehicle travel), a power element substrate 120 and terminal bases 116, 118 are housed in the center portion, and reactor L1 is housed on the right side. When mounted on the vehicle, opening 108 is closed by a cover. It is to be noted that the arrangement may be reversed such that capacitor C2 is housed on the right side and reactor L1 is housed on the left side.

In other words, reactor L1 is positioned on one side of the rotation shaft of each of motor generators MG1 and MG2, and capacitor C2 is positioned on another side thereof. Power element substrate 120 is disposed in the region between capacitor C2 and reactor L1. Motor generator MG2 is disposed below power element substrate 120.

Power element substrate 120 is equipped with inverter 22 controlling motor generator MG1, inverter 14 controlling motor generator MG2, and an arm portion 13 of boost converter 12.

Bus bars for power supply which are vertically stacked are provided in the region between inverters 14 and 22. One bus bar is extended from each of U-phase arm 15, V-phase arm 16 and W-phase arm 17 of inverter 14 to terminal base 116 connected to the stator coil of motor generator MG2. Similarly, three bus bars are also extended from inverter 22 to terminal base 118 connected to the stator coil of motor generator MG1. A power cable or bus bar connects between terminal bases 118 and 116 on the stator coil side of motor generator MG2. Although not shown, a terminal base is provided also for the stator coil of motor generator MG1.

A water passage is provided under power element substrate 120 in order to cool power element substrate 120 which reaches a high temperature. A cooling water inlet 114 and a cooling water outlet 112 to the water passage are provided in case 102. It is to be noted that these inlet and outlet are configured, for example, by screwing a union nut or the like through flanges 106, 105 into case 102.

The voltage applied from battery unit 40 in FIG. 1 to terminals 43 and 44 through power cables 6 and 8 is boosted by boost converter 12 including reactor L1 and arm portion 13. The boosted voltage is then smoothed by capacitor C2 and supplied to inverters 14 and 22.

Thus, boost converter 12 is used to boost the battery voltage for application, with the result that the battery voltage can be lowered to approximately 200V while driving the motor generator at a high voltage exceeding 500V. Consequently, the electric power is supplied with small current, allowing the loss of electricity to be suppressed and a high output power of the motor to be achieved.

In the case where, in addition to inverters 14, 22 and motor generators MG1, MG2, boost converter 12 is also to be integrated as drive device 20, it should be considered where reactor L1 and capacitor C2 which are relatively large components are arranged.

Figure 5:
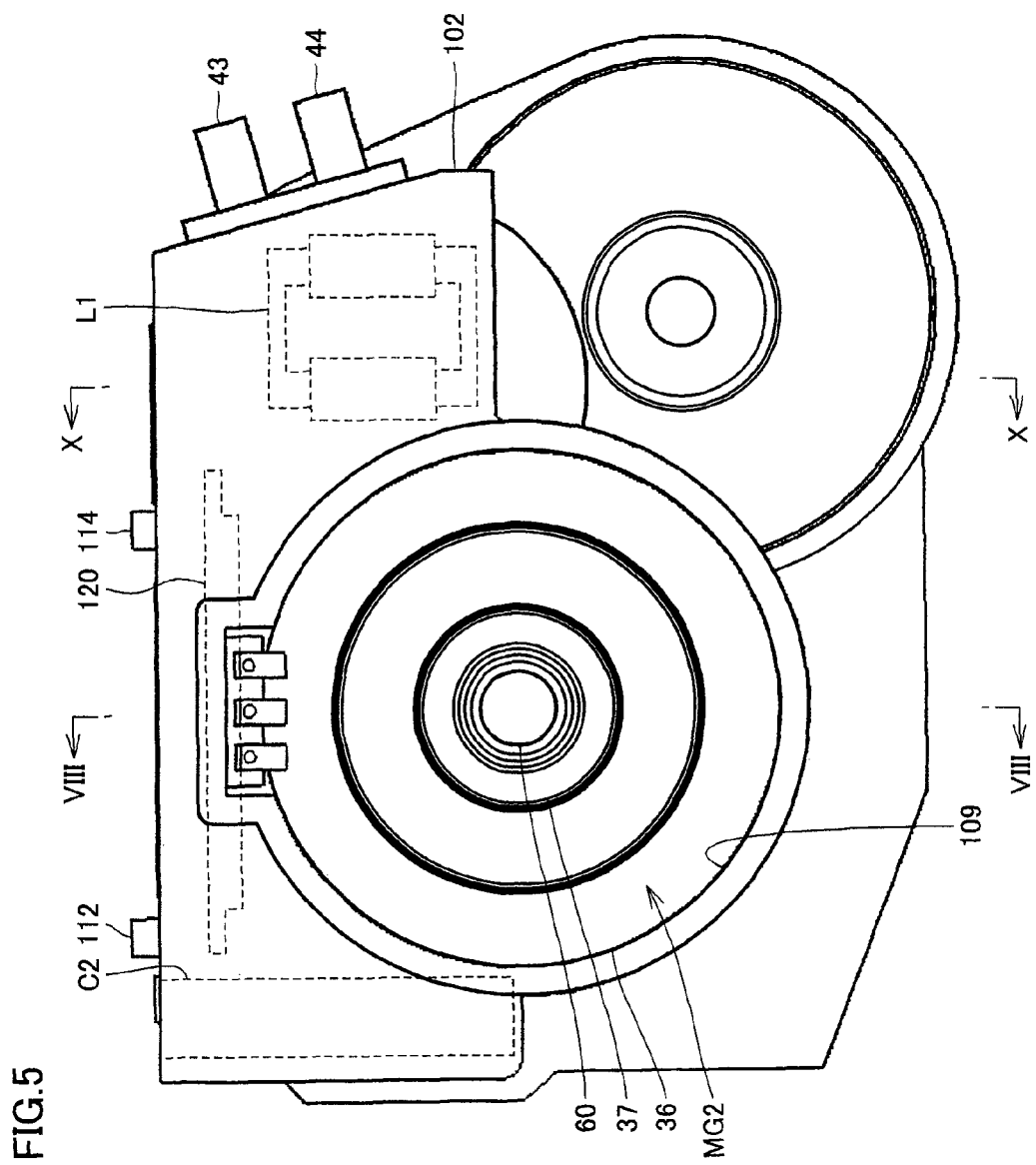
FIG. 5 is a side view of the drive device as seen from an X1 direction in FIG. 4.

FIG. 5 is a side view of drive device 20 as seen from an X1 direction in FIG. 4. Referring to FIG. 5, case 102 is provided with an opening 109 for installation and maintenance of the motor generator. When mounted on the vehicle, this opening 109 is closed by a cover.

Motor generator MG2 is disposed within opening 109. Rotor 37 is disposed within stator 36 to which the bus bars of the U-, V- and W-phases are connected. A hollow shaft 60 can be seen in the center portion of rotor 37.

As shown in FIG. 5, since stator 36 of motor generator MG2 extends largely into a housing chamber of case 102 that houses power control unit 21, reactor L1 is disposed on one side of motor generator MG2 and capacitor C2 is disposed on another side thereof, allowing the large components to be efficiently housed. Consequently, a compact drive device for a hybrid vehicle can be implemented.

Figure 6:
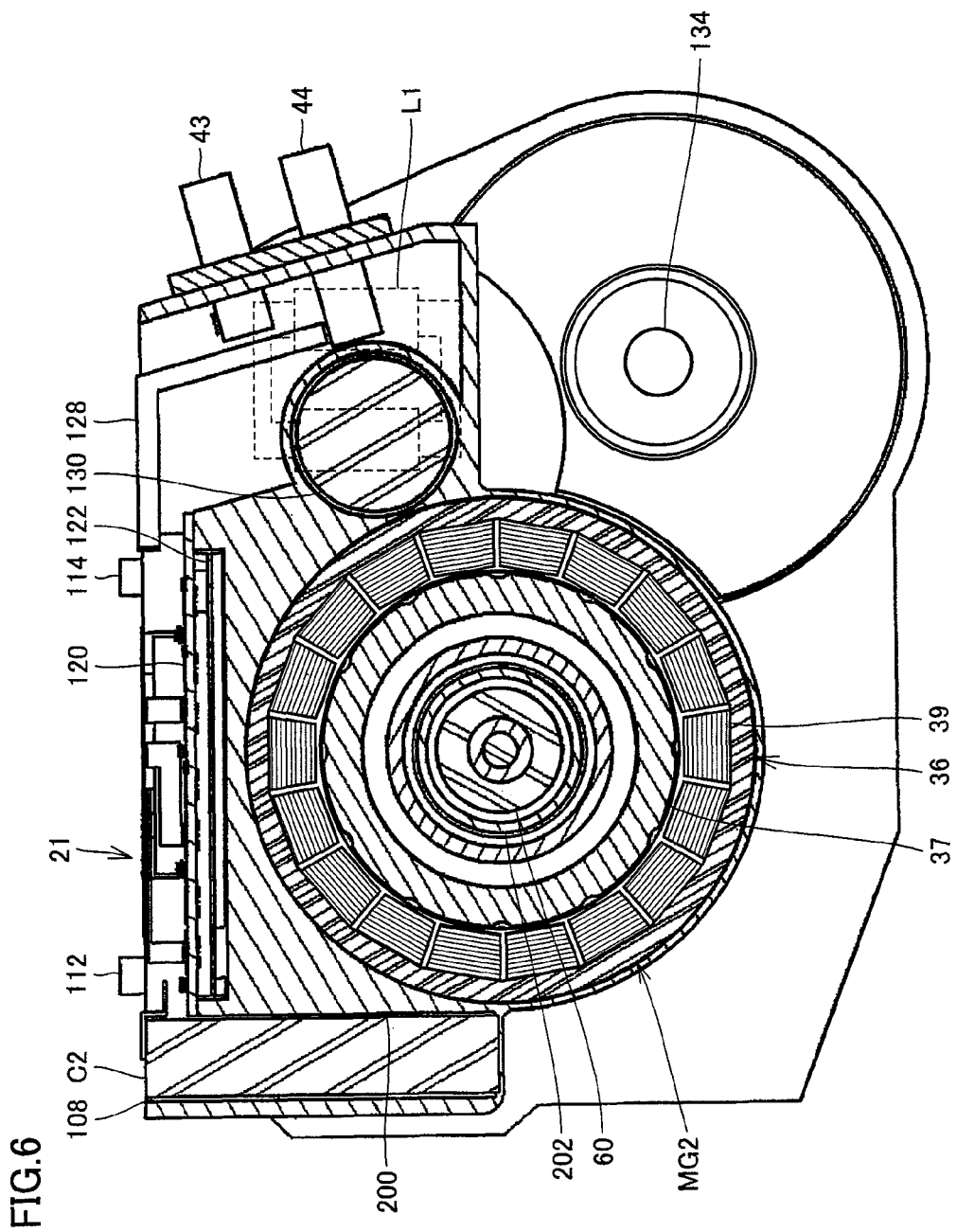
FIG. 6 is a cross-sectional view taken along a cross section VI-VI in FIG. 4.

FIG. 6 is a cross-sectional view taken along a cross section VI-VI in FIG. 4.

Referring to FIG. 6, the cross section of motor generator MG2 and the cross section of the housing chamber housing power control unit 21 are shown.

The hybrid vehicle drive device includes motor generator MG2 and motor generator MG1 provided in the backward direction of motor generator MG2, each having a rotor with the rotational center axis arranged coaxially; a power split device located coaxially with the rotational center axis of the crankshaft and disposed between motor generators MG1 and MG2; and power control unit 21 controlling motor generators MG1, MG2.

Power control unit 21 is provided with reactor L1 and smoothing capacitor C2 separated from each other, in which at least reactor L1 is disposed on one side and smoothing capacitor C2 is disposed on another side with respect to the rotational center axis of motor generator MG2. Motor generators MG1 and MG2, power split device PSD and power control unit 21 are housed in the case for integration.

Case 102 is provided with a partition wall 200 separating two spaces from each other so as to prevent the lubricating oil in motor generator MG2 from leaking to the power element substrate 120 side. This partition wall 200 is provided at its upper surface portion with a water passage 122 for cooling power element substrate 120. Water passage 122 is in communication with cooling water inlet 114 and cooling water outlet 112 as described above.

The power supply potential on the negative side is transmitted from terminal 44 to power element substrate 120 through a bus bar 128. The power supply potential on the positive side is transmitted from terminal 43 to reactor L1 through another bus bar which is not shown.

It is to be noted that the portion supporting a rotation shaft 130 of the reduction gear extends into the housing chamber housing power control unit 21.

With regard to the cross section portion of motor generator MG2, the portion having coil 39 wound around stator 36 can be seen in the inner circumference of the stator, and, in the further inner circumference, rotor 37, a partition wall 202 of the case and hollow shaft 60 of the rotor can be seen.

Figure 7:
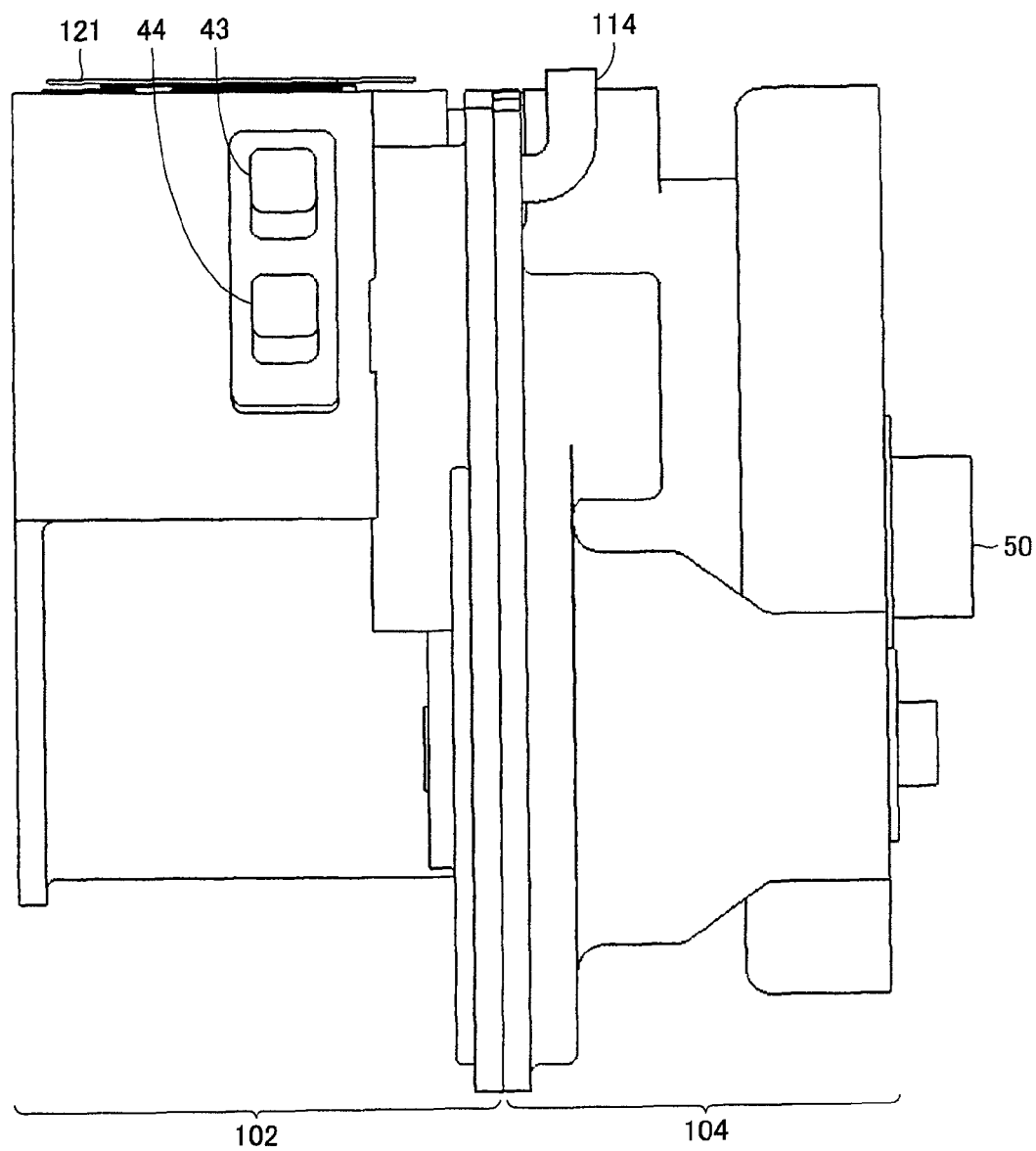
FIG. 7 is a side view of the drive device as seen from an X2 direction in FIG. 4.

FIG. 7 is a side view of drive device 20 as seen from an X2 direction in FIG. 4. In FIG. 7, a control substrate 121 controlling a power element is disposed above the power element substrate.

Figure 8:
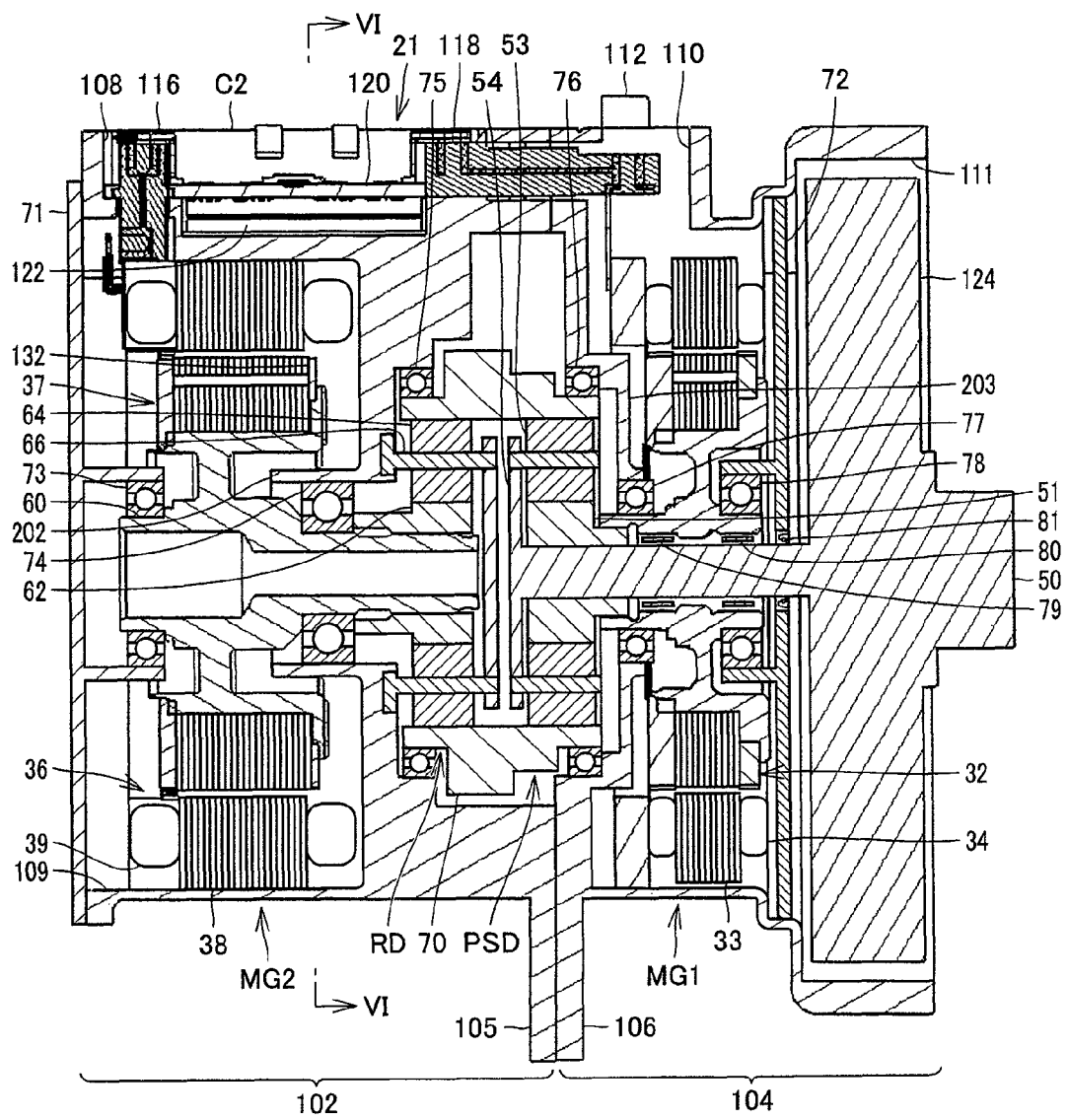
FIG. 8 is a cross-sectional view taken along VIII-VIII in FIG. 4.

FIG. 8 is a cross-sectional view taken along VIII-VIII in FIG. 4.

Referring to FIGS. 7 and 8, crankshaft 50 of the engine is connected to a damper 124, and the output shaft of damper 124 is connected to power split device PSD.

Dumper 124, motor generator MG1, power split device PSD, reduction device RD and motor generator MG2 are arranged on the same rotation axis in this order from the side on which the engine is located. The shaft of rotor 32 of motor generator MG1 is hollow, through which the output shaft from dumper 124 passes.

Rotor 32 of motor generator MG1 has its shaft spline-fit with sun gear 51 on the power split device PSD side. Dumper 124 has its shaft coupled to planetary carrier 54. Planetary carrier 54 rotatably supports the rotation shaft of pinion gear 53 about the shaft of dumper 124. Pinion gear 53 engages with sun gear 51 and ring gear 52 in FIG. 2 formed in the inner circumference of the ring gear case.

Shaft 60 of motor generator MG2 has its reduction device RD side spline-fit with sun gear 62. Planetary carrier 66 of reduction device RD is fixed to partition wall 202 of case 102. Planetary carrier 66 supports the rotation shaft of pinion gear 64. Pinion gear 64 engages with sun gear 62 and ring gear 68 in FIG. 2 formed in the inner circumference of the ring gear case.

As can be understood from FIG. 8, motor generator MG1 and dumper 124 can be installed through an opening 111 of case 104 on the right side in the figure, motor generator MG2 can be installed through opening 109 of case 102 on the left side, and reduction device RD and power split device PSD can be installed through the joining surfaces of flanges 105 and 106.

Opening 109 of case 102 is tightly sealed by a cover 71, a liquid gasket and the like so as to prevent leakage of the lubricating oil. A cover 72 is provided behind opening 111 of case 104, and the space in which motor generator MG1 is housed is tightly sealed by a liquid gasket, an oil seal 81 or the like so as to prevent leakage of the lubricating oil.

The shaft of rotor 32 of motor generator MG1 is rotatably supported by a ball bearing 78 provided between the shaft and cover 72 and a ball bearing 77 provided between the shaft and a partition wall 203. The shaft of rotor 32 is hollow, through which the shaft of dumper 124 passes. Needle bearings 79 and 80 are provided between the shaft of rotor 32 and the shaft of damper 124.

The shaft of rotor 37 of motor generator MG2 is rotatably supported by a ball bearing 73 provided between the shaft and cover 71 and a ball bearing 74 provided between the shaft and partition wall 202.

The ring gear case having the ring gear of reduction device RD and the ring gear of power split device PSD both cut on its inner circumference is rotatably supported by a ball bearing 75 provided between the ring gear case and partition wall 202 and a ball bearing 76 provided between the ring gear case and partition wall 203.

While the housing chamber housing power control unit 21 and the housing chamber housing motor generator MG2 are separated by partition wall 202 of case 102, the chambers are partially, connected to each other via a through hole into which terminal base 116 is inserted. This terminal base 116 has one side connected to the bus bar of the stator coil of motor generator MG2 and the other side connected to the bus bar of inverter 14. A conductive member passes through terminal base 116 such that these bus bars can be electrically connected. In other words, terminal base 116 is configured not to allow the lubricating oil content from the motor generator MG2 side to pass therethrough, but to allow electricity to pass therethrough.

Similarly, the space in which power control unit 21 is housed and the space in which motor generator MG1 is housed are connected to each other via terminal base 118 in such a state that electricity is allowed to pass therethrough but the lubricating oil content is not allowed to pass therethrough.

Figure 9:
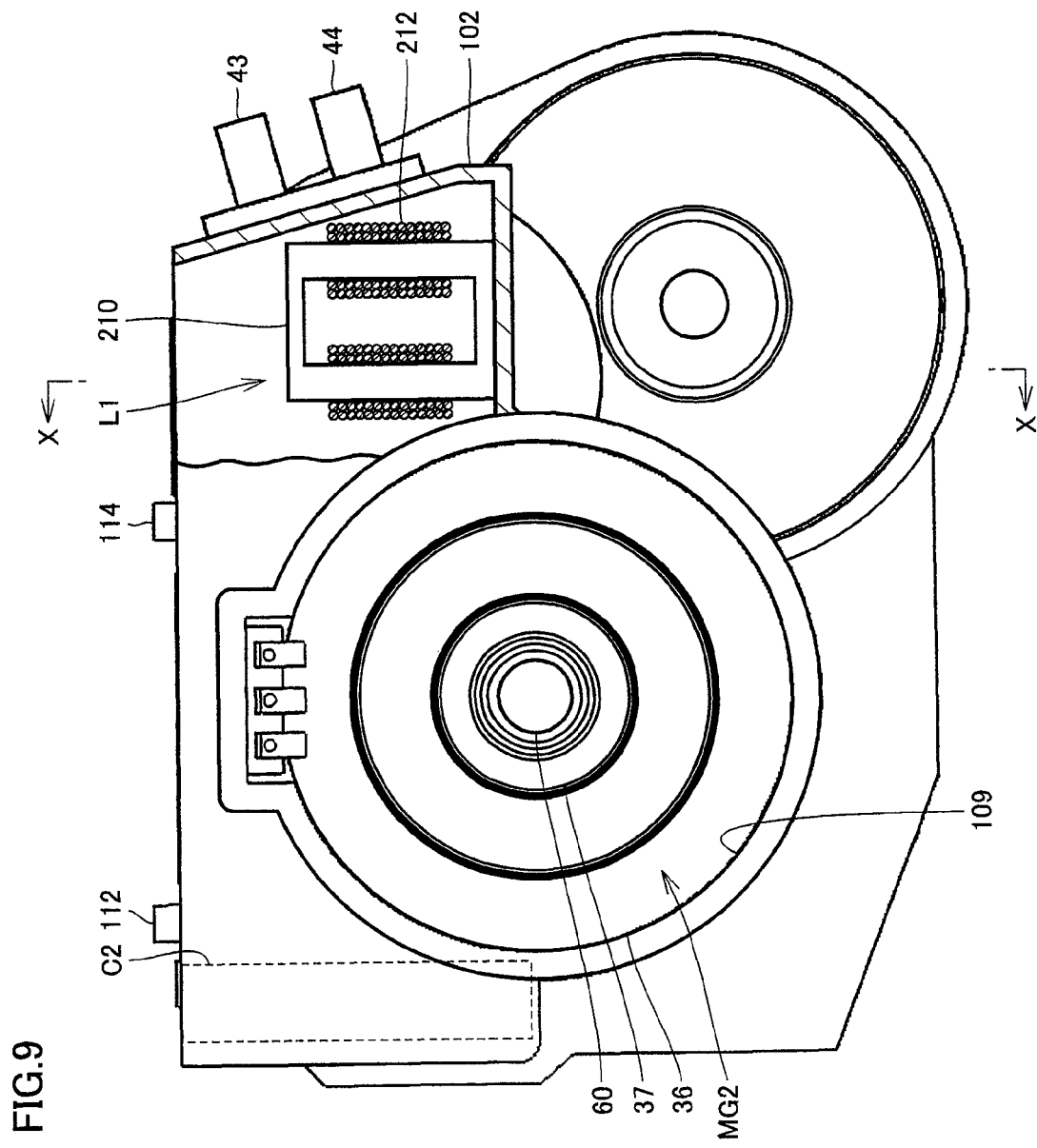
FIG. 9 is a partial cross-sectional view showing a partial cross section taken along IX-IX in FIG. 4.

FIG. 9 is a partial cross-sectional view showing a partial cross section taken along IX-IX in FIG. 4. Furthermore, FIG. 10 is a cross-sectional view showing a cross section taken along X-X in FIG. 9.

Figure 10:
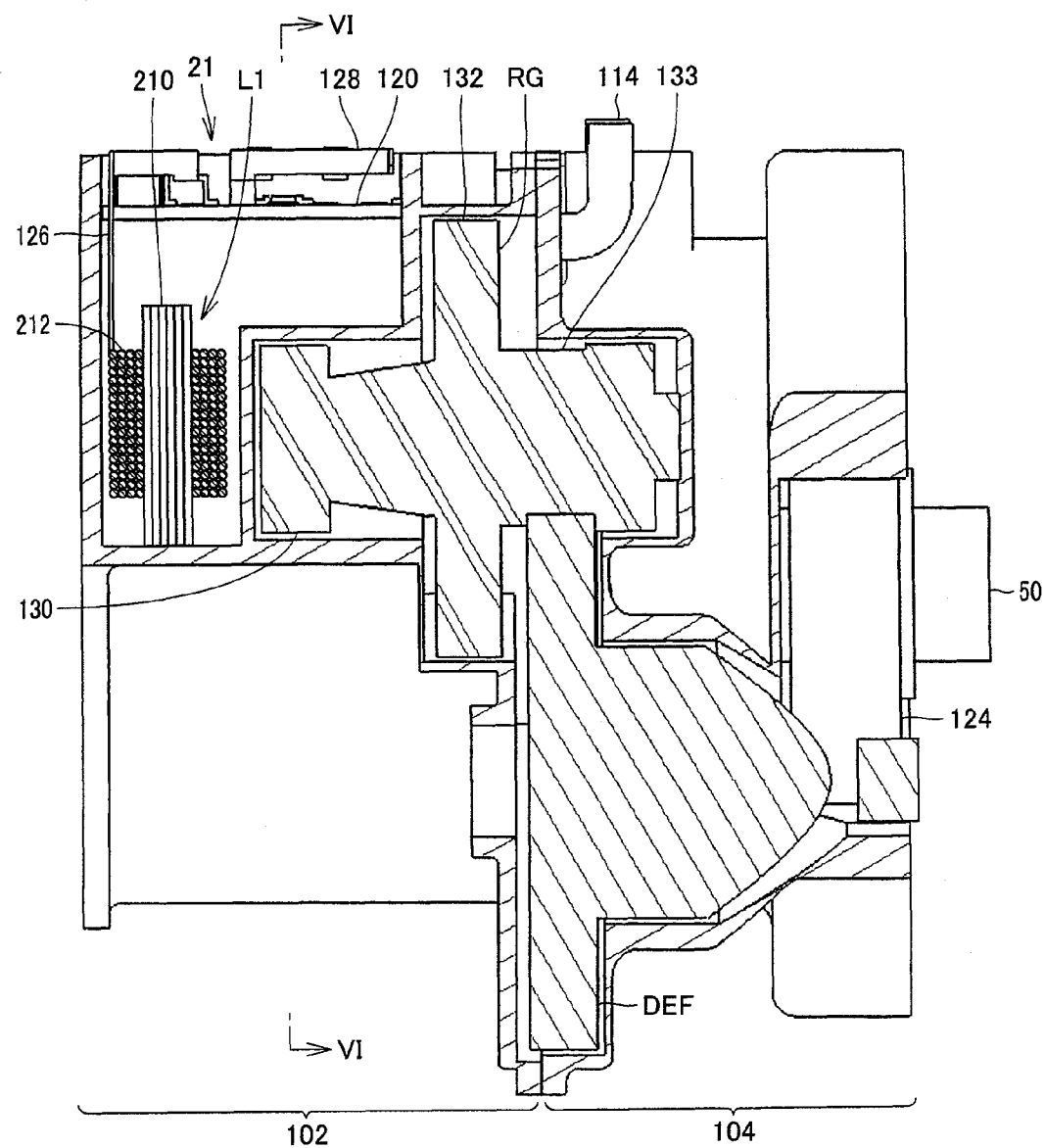
FIG. 10 is a cross-sectional view showing a cross section taken along X-X in FIG. 9.

Referring to FIGS. 9 and 10, the cross section of reactor L1 is shown in the housing chamber housing power control unit 21. Reactor L1 has, for example, a structure in which a coil 212 is wound around a core 210 formed by stacking electromagnetic steel plates.

Furthermore, as shown in FIG. 10, rotation shaft 130 of power transmission reduction gear RG shown in FIG. 6 is disposed in the vicinity of reactor L1, and a counter driven gear 132 of power transmission reduction gear RG is shown in the center portion. Counter driven gear 132 engages with counter drive gear 70 in FIG. 2. Provided coaxially with counter driven gear 132 is a final drive gear 133, and differential gear DEF as a final driven gear engaging therewith is shown therebelow.

It is to be noted that power split device PSD, reduction gear RG receiving the torque from power split device PSD and differential gear DEF engaging with reduction gear RG and transmitting the torque to the wheels correspond, as a whole, to a "power transmission mechanism" combining the power generated by the engine with the power generated by motor generators MG1, MG2 and transmitting the resulting power to the drive shaft.

Furthermore, reduction gear RG and differential gear DEF each correspond to a "power transmission gear" to which the torque from power split device PSD is transmitted. However, reduction gear RG and differential gear DEF are not always necessary, and the present invention is applicable also to a vehicle having a structure without reduction gear RG or having a rear-wheel drive structure in which differential gear DEF is not integrated with the drive device.

Furthermore, the present invention is applicable to a parallel hybrid in which the motor provides assistance during the acceleration of the engine and the like, and also applicable to a structure in which only one motor is integrated with the drive device.

[Description of Arrangement of Reactor L1]

Referring to FIGS. 9 and 10, reactor L1 is arranged such that at least a portion of core 210 comes into contact with the partition wall of case 102 forming a housing chamber in which power control unit 21 is housed.

This arrangement allows heat to be directly exchanged between core 210 and case 102. The drive device having the above-described integrated structure causes an increase in heat capacity of case 102 housing motor generator MG2, and the inverter and the boost converter controlling motor generator MG2. This allows the cooling system to be configured such that the heat generated in core 210 is dissipated to case 102 having a large heat capacity. Consequently, the temperature rise in reactor L1 can be suppressed to thereby allow prevention of efficiency degradation in the boost converter.

With regard to the arrangement of reactor L1 as shown in FIGS. 9 and 10, coil 212 is disposed so as not to contact case 102, to thereby ensure the electrical insulation between coil 212 and case 102.

Thus, according to the embodiment of the present invention, the heat is dissipated to case 102 having a large heat capacity, allowing the coolness of reactor L1 to be ensured. Accordingly, it becomes possible to overcome the limitations on the arrangement caused by disposing reactor L1 in proximity to the cooling system of power element substrate 120 or by additionally providing the coolant for cooling the reactor. This allows the degree of flexibility in the arrangement of reactor L1 to be increased.

As a result, in the vehicle drive device in which the motor generator, and the inverter and the boost converter for driving the motor generator are integrated, reactor L1 can be efficiently arranged in the limited space, to thereby allow the device to be reduced in size. In other words, according to the vehicle drive device of the present invention, the coolness of reactor L1 can be ensured while the device can be reduced in size.

Furthermore, according to the present invention, the case is configured and reactor L1 is arranged such that, when the case is projected in the direction of the rotation shaft, the height of the projected portion of the case, when mounted on the vehicle, housing reactor L1 at least does not exceed the height of the remaining space of the case, that is, the height of the portion housing damper 124, motor generator MG2, power transmission reduction gear RG and differential gear DEF. Specifically, in the present embodiment, power element substrate 120, reactor L1 and capacitor C2 constituting power control unit 21 are disposed within the vertical dimension of the vehicle drive device defined by the outer edge of the case portion housing differential gear DEF and the outer edge of the case portion housing damper 124. Consequently, the center of gravity of the vehicle can be lowered and the running stability of the vehicle can be improved.

Furthermore, the case is configured and power control unit 21 is arranged such that, in the horizontal direction at the time when mounted on the vehicle, the projected portion of the case housing power control unit 21 is located within the projected portion of the remaining space of the case. This causes the vehicle drive device to be reduced in size.

[Modification]

Figure 11:
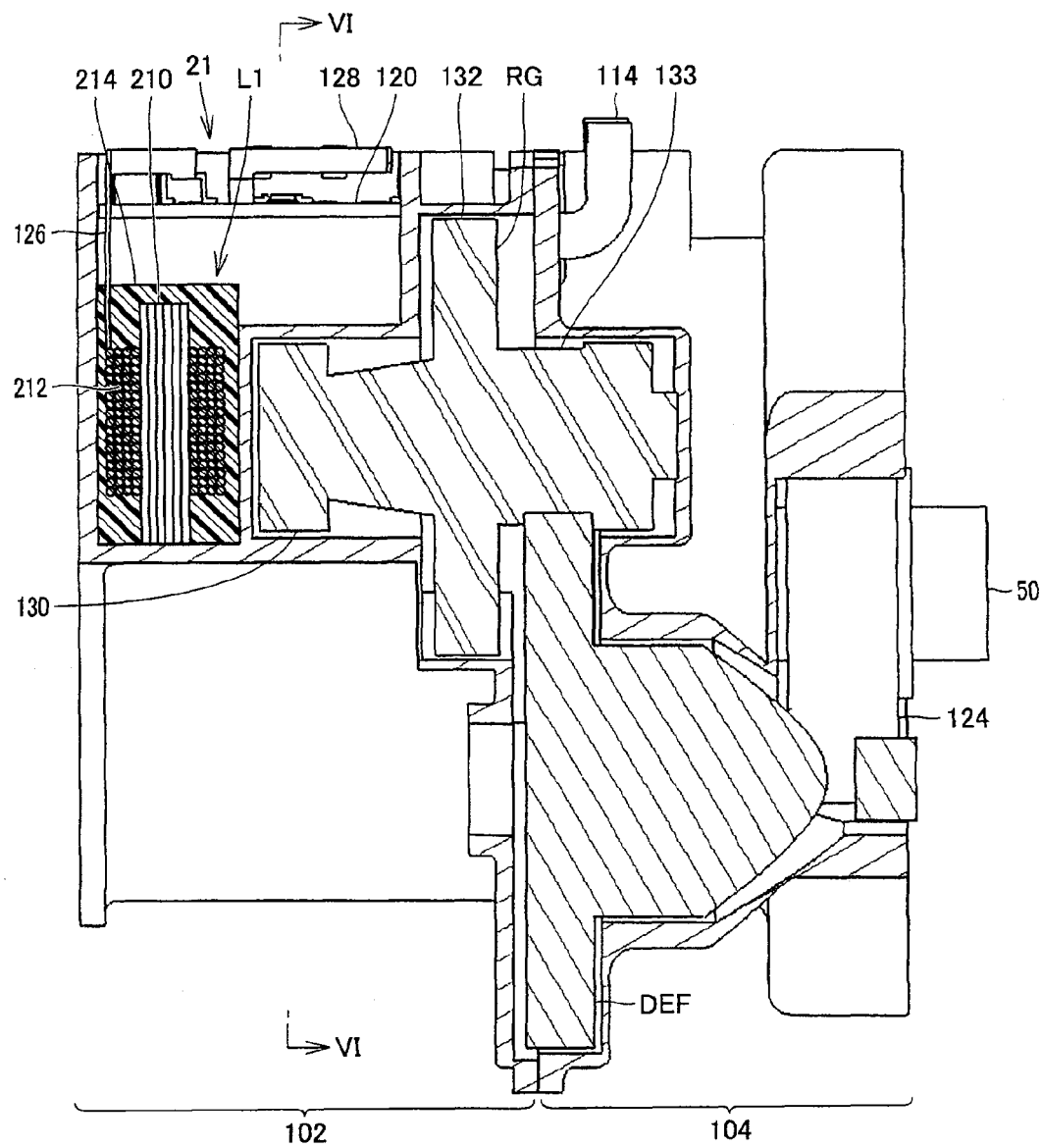
FIG. 11 is a cross-sectional view of a vehicle drive device for illustrating a modification of a reactor portion.

Reactor L1 may be configured as with a modification shown in FIG. 11.

FIG. 11 is a cross-sectional view of a vehicle drive device for illustrating a modification of the reactor portion.

Referring to FIG. 11, as compared to the configuration shown in each of FIGS. 9 and 10, reactor L1 is different in that it is molded by an insulation member 214 having heat conductivity.

For more detailed description, reactor L1 is disposed such that a part of core 210 comes into contact with case 102 similarly as shown in FIGS. 9 and 10. Insulation member 214 is provided in the gap between reactor L1 and case 102.

As a material of insulation member 214, for example, epoxy resin and the like having insulation properties and high heat conductivity can be used. It is to be noted that, when resin is used for insulation member 214, resin is filled so as to fill the gap between reactor L1 and partition wall 202.

Furthermore, another example may provide a structure in which the gap between reactor L1 and case 102 is filled, for example, with grease to transmit the heat of reactor L1 to case 102 for dissipation.

In the present modification, insulation member 214 having heat conductivity is interposed between reactor L1 and partition wall 102, which causes the heat of reactor L1 to be directly transmitted from core 210 to case 102 for dissipation and also to be transmitted to case 102 for dissipation using insulation member 214 as a heat transfer agent. In other word, the heat of reactor L1 can be efficiently dissipated to case 102 having a large heat capacity. Therefore, according to the present modification, as compared to the configuration shown in each of FIGS. 9 and 10, the heat dissipation performance of reactor L1 can be further improved.

Also in the present modification, the coolness of reactor L1 can be ensured which is arranged effectively utilizing the empty space in the case. Consequently, the drive device can be reduced in size while suppressing temperature rise in reactor L1.

Furthermore, as reactor L1 is disposed within the vertical dimension of the vehicle drive device which is defined by the outer edge of the case portion housing differential gear DEF and the outer edge of the case portion housing damper 124, the center of gravity of the vehicle can be lowered and the running stability of the vehicle can be improved.

[Description of Cooling System of Power Element Substrate 120]

Figure 12:
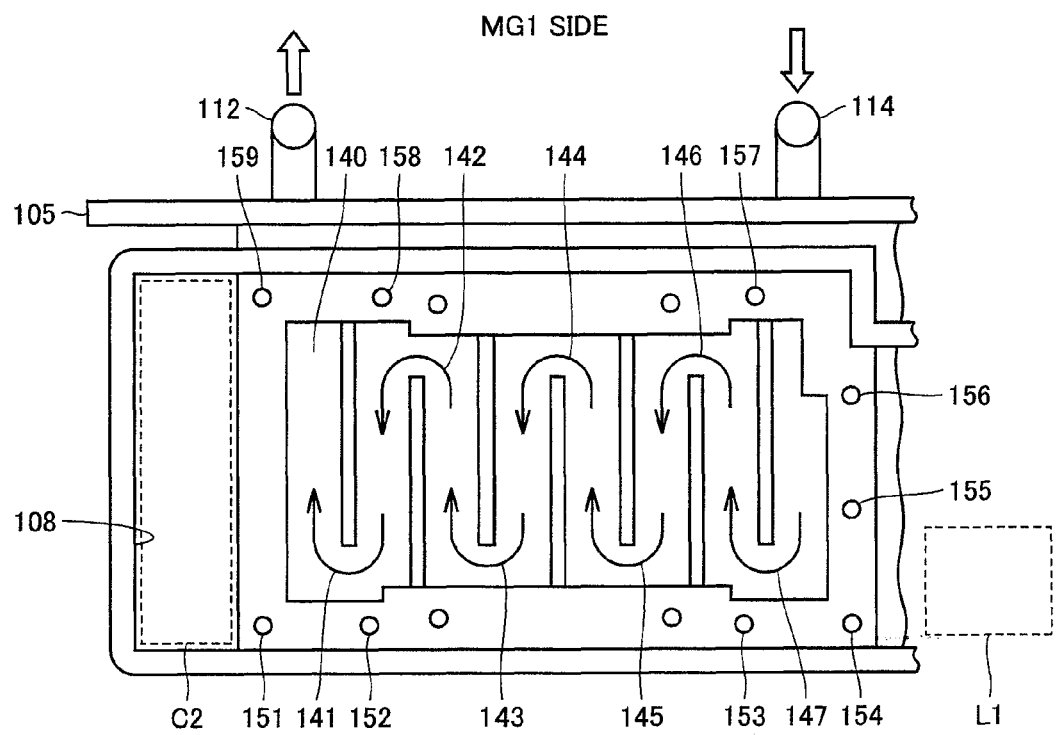
FIG. 12 is a diagram for illustrating a water passage of the cooling water cooling a power element substrate.

FIG. 12 is a diagram for illustrating a water passage of the cooling water cooling power element substrate 120.

FIG. 12 shows the state in which power element substrate 120 in FIG. 4 is removed. The cooling water flows from cooling water inlet 114 in the direction as shown by arrows 141-147 and is discharged from cooling water outlet 112. The cooling water is then delivered to the radiator (not shown) disposed in the front portion of the vehicle. A rib or fin is provided on the surface of case 102 or the undersurface of power element substrate 120 such that the cooling water flows as shown by these arrows 141-147.

It is to be noted that power element substrate 120 is coated with liquid gasket so as to maintain water-tightness, and screwed through screw holes 151-159.

Although the example in which power element substrate 120 is water-tightly covered has been described with reference to FIG. 12, for example, cooling water inlet 114 and cooling water outlet 112 may be connected and piping provided with a flow path shown by arrows 141-147 may be embedded therein.

The above-described cooling system having a flow path of the cooling water is applied to power element substrate 120 shown in FIG. 4, which results in the configuration in which arm portion 13 of boost converter 12 and inverters 14, 22 are arranged in series in the flow path of the cooling water. Accordingly, a cooling system can be provided in common for arm portion 13 of boost converter 12 and inverters 14 and 22, and therefore, the cooling system in the vehicle can be downsized.

Furthermore, according to the present embodiment, in the above-described arrangement configuration, arm portion 13 of boost converter 12 is disposed upstream of inverters 14 and 22 as seen from cooling water inlet 114.

The above-described arrangement configuration is provided since the heat amount of arm portion 13 of boost converter 12 is larger than the heat amount of each of inverters 14 and 22, and accordingly, arm portion 13 of boost converter 12, inverters 14 and 22 are arranged in this order from the upstream side as seen from cooling water inlet 114, to thereby efficiently cool power element substrate 120.

For more detailed description, in power element substrate 120, the heat amount differs between arm portion 13 of boost converter 12 and inverters 14, 22 due to the difference in the power loss occurring during the switching operation. Specifically, arm portion 13 of boost converter 12 is higher in switching frequency of the power element than inverters 14 and 22, which causes the switching loss occurring at the time when the power element is turned on or off to be increased as compared to inverters 14 and 22. Accordingly, arm portion 13 of boost converter 12 tends to have a heat amount greater than that of each of inverters 14 and 22.

In this case, if arm portion 13 of boost converter 12 is disposed downstream from inverters 14 and 22 in the flow path of the cooling water, the cooling water raised in temperature due to the heat exchange with inverters 14 and 22 is supplied to arm portion 13, which makes it difficult to ensure the coolness of arm portion 13 of high temperature.

In contrast, according to the present embodiment, as arm portion 13 is disposed upstream from inverters 14 and 22, the cooling water of low temperature is supplied to arm portion 13, which allows the coolness of arm portion 13 to be ensured. While the cooling water which has been subjected to heat exchange with arm portion 13 having a large heat amount is to be supplied to inverters 14 and 22, the cooling performance for inverters 14 and 22 of relatively low temperature due to its small heat amount will not be impaired. Accordingly, power element substrate 120 can be efficiently cooled without the need to improve the performance of the cooling system, such as to increase the flow rate of the cooling water. Consequently, the cooling system can be prevented from being increased in size, which is effective in reducing the drive device in size.

[Modification]

Figure 13:
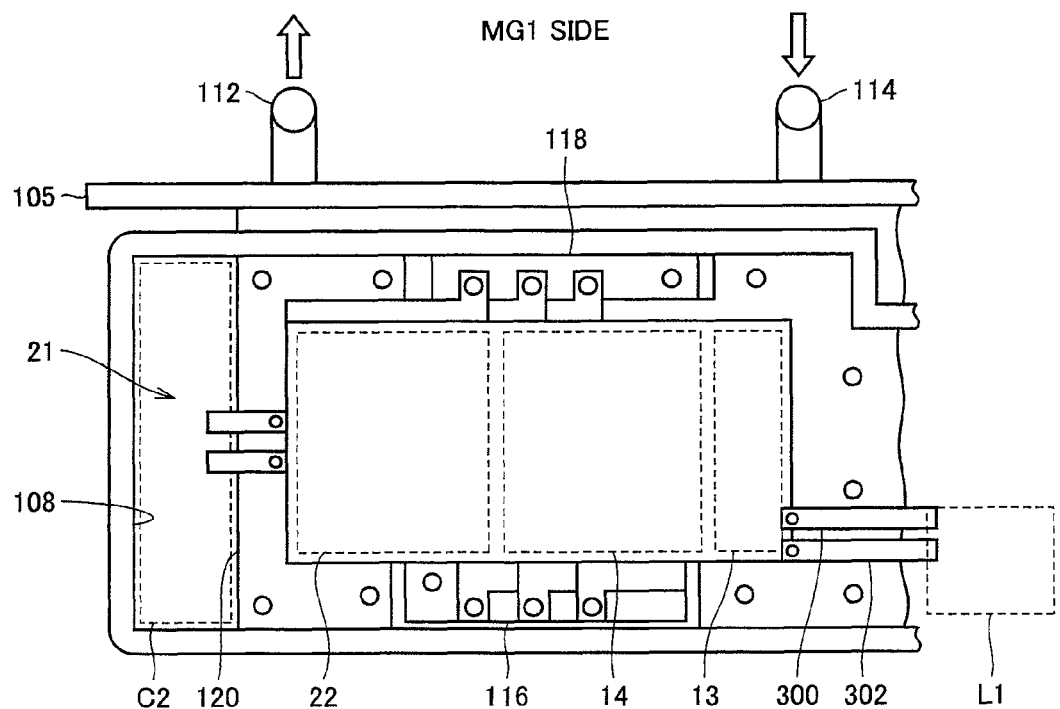
FIG. 13 is a diagram for illustrating a modification of a cooling system of the power element substrate.

FIG. 13 is a diagram for illustrating a modification of the cooling system of power element substrate 120.

Referring to FIG. 13, power element substrate 120 in FIG. 4 is diagrammatically shown. Power element substrate 120 is disposed in the region between capacitor C2 and reactor L1, as described above. Power element substrate 120 is equipped with inverter 22 controlling motor generator MG1, inverter 14 controlling motor generator MG2, and arm portion 13 of boost converter 12. It is to be noted that the flow path of the cooling water shown in FIG. 12 is provided below power element substrate 120.

Figure 14:
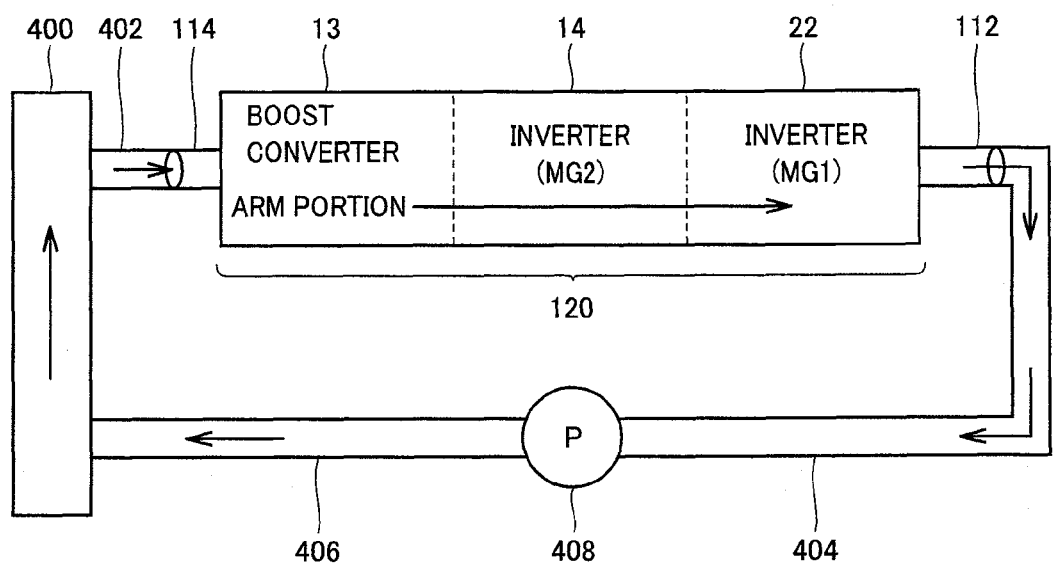
FIG. 14 is a block diagram conceptually showing a cooling structure of the power element substrate shown in FIG. 13.

According to the present modification, in power element substrate 120, arm portion 13 of boost converter 12 is disposed at the uppermost stream of the flow path of the cooling water, inverter 14 is disposed downstream of the flow path, and inverter 22 is disposed at the lowermost stream of the flow path. FIG. 14 conceptually shows the cooling structure of the power element substrate shown in FIG. 13.

Referring to FIG. 14, a coolant path 402 is provided between a first port of a radiator 400 and power element substrate 120, a coolant path 404 is provided between power element substrate 120 and a water pump 408, and a coolant path 406 is provided between water pump 408 and a second port of radiator 400. It is to be noted that coolant paths 402 and 404 are coupled to cooling water inlet 114 and cooling water outlet 112, respectively, which are shown in FIG. 13.

Water pump 408, which serves to circulate the cooling water such as an antifreeze solution, circulates the cooling water in the direction of the arrows shown in the figure. Radiator 400 cools the cooling water which has passed through power element substrate 120.

In power element substrate 120, arm portion 13 of boost converter 12, inverter 14 and inverter 22 are connected in series in the flow path which is not shown. Furthermore, arm portion 13 of boost converter 12, inverter 14 and inverter 22 are arranged in this order from the upstream side as seen from radiator 400.

This arrangement configuration is provided in consideration of the fact that the heat amount differs between inverter 14 and inverter 22, in addition to the fact that the heat amount of arm portion 13 of boost converter 12 is relatively large as described above.

For more detailed description, in the present embodiment, since motor generator MG1 is mainly used for generating electric power and motor generator MG2 is mainly used for generating vehicle driving force, motor generator MG2 tends to have a driving current higher than that of motor generator MG1. Therefore, inverter 14 has a higher current flowing through the power element than that of inverter 22, and accordingly, causes a steady loss occurring at the time when the power element is being turned on or off to be increased as compared to inverter 22. In other words, the heat amount is larger in inverter 14 than in inverter 22, with the result that the relationship is established between arm portion 13 of boost converter 12 and inverters 14, 22 such that the heat amount is greatest in arm portion 13 of boost converter 12 and smallest in inverter 22.

Accordingly, in the present modification, boost converter 12, inverter 14 and inverter 22 are arranged in descending order of the heat amount from the upstream side, to thereby allow power element substrate 120 to be more efficiently cooled without the need to improve the performance of the cooling system. As a result, the cooling system can be prevented from being increased in size, which is further effective in reducing the drive device in size.

Although the example in which arm portion 13 of boost converter 12, inverter 14 and inverter 22 are arranged in this order from the upstream side as seen from cooling water inlet 114 has been described in the present modification, the arrangement order is not limited to this example, and the components may be arranged in descending order of the heat amount.

Furthermore, according to the present embodiment and the modification thereof, cooling water inlet 114 and cooling water outlet 112 of the flow path are provided on the motor generator MG1 side, which allows the path for supplying and discharging the cooling water to be ensured even in the case where capacitor C2 and reactor L1 are arranged on opposite sides of power element substrate 120. The inlet and outlet can be provided on the opposite side of motor generator MG1. However, in the case where the drive device for a hybrid vehicle is disposed in the engine room, the body is located in proximity thereto, which deteriorates the workability. Accordingly, it is preferable to provide cooling water inlet 114 and cooling water outlet 112 of the flow path on the motor generator MG1 side.

As reactor L1 is disposed in proximity to arm portion 13 of boost converter 12, the wiring length of the conductor member (for example, bus bars 300, 302 in FIG. 13) for electrically connecting arm portion 13 and reactor L1 can be shortened.

Consequently, since the wiring inductance of the conductor member can be decreased, the surge voltage generated at the time of the switching operation of arm portion 13 can be decreased.

As described above, according to the embodiment of the present invention, while the drive device integrally housing the motor generator, and the inverter and the boost converter for driving the motor generator can be implemented, the heat dissipation performance of the reactor which is efficiently arranged in the limited space can also be improved in the integrated structure.

Furthermore, in the power element substrate on which the power elements including an inverter and a boost converter are integrally mounted, the coolness can be ensured without improving the performance of the cooling system.

Consequently, the coolness of the electric circuit group can be ensured while the drive device can be reduced in size.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can be used for a vehicle drive device in which a rotating electrical machine and an electric circuit group (a converter, an inverter and the like) driving the rotating electrical machine are integrated.

The invention claimed is:

1. A vehicle drive device comprising:
a rotating electrical machine;
a power control unit controlling said rotating electrical machine;
a case housing said rotating electrical machine and said power control unit;
a damper to which a crankshaft of an internal combustion engine is coupled; and
a power transmission mechanism combining power generated by said internal combustion engine with power generated by said rotating electrical machine for transmission to a drive shaft,
said power control unit including
an inverter driving said rotating electrical machine,
a voltage converter configured to have a reactor, for boosting a power supply voltage to apply the boosted voltage to said inverter, and
a circuit element substrate on which a power element of each of said inverter and said voltage converter is mounted,
said case is configured to integrally house said damper, said rotating electrical machine and said power transmission mechanism,
said reactor and said circuit element substrate are disposed in said case such that, when projected in a direction of a rotation shaft, said reactor and said circuit element substrate fall within a vertical dimension of a projected portion of said case, when mounted on the vehicle, that houses said damper, said rotating electrical machine and said power transmission mechanism, and
said reactor including
a core disposed to transmit and receive heat to and from said case, and
a coil wound around said core.

2. A vehicle drive device comprising:
a rotating electrical machine;
a power control unit controlling said rotating electrical machine;
a case housing said rotating electrical machine and said power control unit;
a damper to which a crankshaft of an internal combustion engine is coupled; and
a power transmission mechanism combining power generated by said internal combustion engine with power generated by said rotating electrical machine for transmission to a drive shaft,
said power control unit including
an inverter driving said rotating electrical machine,
a voltage converter configured to have a reactor, for boosting a power supply voltage to apply the boosted voltage to said inverter, and
a circuit element substrate on which a power element of each of said inverter and said voltage converter is mounted,
said case is configured to integrally house said damper, said rotating electrical machine and said power transmission mechanism,
said reactor and said circuit element substrate are disposed in said case such that, when projected in a direction of a rotation shaft, said reactor and said circuit element substrate fall within a horizontal dimension of a projected portion of said case, when mounted on the vehicle, that houses said damper, said rotating electrical machine and said power transmission mechanism, and
said reactor including
a core disposed to transmit and receive heat to and from said case, and
a coil wound around said core.

3. The vehicle drive device according to claim 1, wherein said core is disposed such that at least a portion of the core is in contact with said case for transmission and reception of the heat.

4. The vehicle drive device according to claim 3, further comprising an insulation member having heat conductivity and disposed in at least a portion of a gap between said reactor and said case.

5. The vehicle drive device according to claim 4, wherein said insulation member includes an insulation resin having heat conductivity, and
said insulation resin is filled in the gap between said reactor and said case.

6. The vehicle drive device according to claim 1, wherein a power element of each of said inverter and said voltage converter is mounted on a main planar surface of said circuit element substrate,
on an opposite side of the main planar surface of said circuit element substrate, a flow path through which a cooling medium cooling said power element substrate flows is provided, and
the power element having a relatively larger heat amount of said inverter and said voltage converter is disposed in said flow path upstream from the power element having a relatively smaller heat amount of said inverter and said voltage converter.

7. The vehicle drive device according to claim 1, wherein said rotating electrical machine includes first and second rotating electrical machines,
said inverter includes first and second inverters provided corresponding to said first and second rotating electrical machines, respectively, a power element of each of said first and second inverters and said voltage converter is mounted on a main planar surface of said circuit element substrate, on an opposite side of the main planar surface of said circuit element substrate, a flow path through which a cooling medium cooling said power element substrate flows is provided, and the power element having a relatively larger heat amount of said first and second inverters and said voltage converter is disposed in said flow path upstream from the power element having a relatively smaller heat amount of said first and second inverters and said voltage converter.

8. The vehicle drive device according to claim 7, wherein said first rotating electrical machine is a motor coupled to a driving wheel of said vehicle, said second rotating electrical machine is a power generator coupled to said internal combustion engine, and the power element of said first inverter is disposed in said flow path upstream from the power element of said second inverter.

9. The vehicle drive device according to claim 8, wherein the power element of said voltage converter is disposed in said flow path upstream from the power element of each of said first and second inverters.

10. The vehicle drive device according to claim 9, wherein said voltage converter further includes a capacitor smoothing an output voltage, said circuit element substrate has at least a portion disposed in a region between said reactor and said capacitor, said power control unit further includes a conductor member electrically connecting the power element of said voltage converter and said reactor, said flow path is provided with an inlet and an outlet of said cooling medium, and the power element of said voltage converter is disposed closer to said reactor and the inlet of said cooling medium than the power element of each of said first and second inverters is.

* * * * *